(12) United States Patent
Ye

(10) Patent No.: US 9,254,723 B2
(45) Date of Patent: Feb. 9, 2016

(54) TRAILER COUPLER

(71) Applicant: Pacific Rim International, LLC, Portland, OR (US)

(72) Inventor: Yibin Ye, Portland, OR (US)

(73) Assignee: Pacific Rim International, LLC, Portland, OR (US)

( * ) Notice: Subject to any disclaimer, the term of this patent is extended or adjusted under 35 U.S.C. 154(b) by 0 days.

(21) Appl. No.: 14/300,002

(22) Filed: Jun. 9, 2014

(65) Prior Publication Data

US 2014/0300084 A1 Oct. 9, 2014

Related U.S. Application Data

(63) Continuation of application No. 13/485,785, filed on May 31, 2012, now Pat. No. 8,746,726.

(60) Provisional application No. 61/491,840, filed on May 31, 2011.

(51) Int. Cl.
*B60D 1/06* (2006.01)
(52) U.S. Cl.
CPC ............ *B60D 1/06* (2013.01); *B60D 1/065* (2013.01); *Y10T 29/49826* (2015.01)
(58) Field of Classification Search
CPC .................................. B60D 1/06; B60D 1/065
See application file for complete search history.

(56) References Cited

U.S. PATENT DOCUMENTS

| | | | |
|---|---|---|---|
| 1,272,486 A | 7/1918 | McManis | |
| 1,636,295 A | 7/1927 | Dempsey | |
| 2,072,473 A | 3/1937 | Baumberger | |
| 2,204,882 A | 6/1940 | Berluti | |
| 2,260,442 A | 10/1941 | Dollase | |
| 2,438,749 A | 3/1948 | Harrer | |
| 2,530,554 A | 11/1950 | Tinnerman | |
| 3,088,752 A | 5/1963 | Dressen | |
| 3,374,268 A | 3/1968 | Groves | |
| 3,433,503 A | 3/1969 | Davis | |
| 3,788,673 A | 1/1974 | Gloege | |
| 3,820,823 A | 6/1974 | Beaston | |
| 3,831,982 A | 8/1974 | Bernhardt et al. | |
| 3,893,713 A | 7/1975 | Ivy | |
| 4,018,453 A | 4/1977 | Bigelow | |
| 4,082,168 A | 4/1978 | Cole et al. | |

(Continued)

OTHER PUBLICATIONS

Redneck Trailer Supplies, parts catalog pages for gooseneck couplers, circa 2009.

(Continued)

*Primary Examiner* — Kevin Hurley
(74) *Attorney, Agent, or Firm* — Kolisch Hartwell, P.C.

(57) ABSTRACT

A trailer coupler may be provided with an opening and socket for a hitch ball, and a clamping bar in an internal channel for locking the coupler and hitch together. The internal channel may extend horizontally and be positioned above the opening and below the socket. The channel may include a laterally-facing aperture adjacent the second end, out of which one end of the clamping bar may extend. That end of the clamping bar may include a bracket with an open channel to fit over a flange on the coupler body. The coupler may be assembled by inserting a first end of the clamping bar through the laterally-facing aperture, and moving the first end of the clamping bar into the coupler body channel while fitting the bracket over the flange at the open channel of the clamping bar.

7 Claims, 5 Drawing Sheets

(56) References Cited

U.S. PATENT DOCUMENTS

| | | | |
|---|---|---|---|
| 4,225,261 | A | 9/1980 | Marx |
| 4,276,850 | A | 7/1981 | Valencia |
| 4,283,073 | A | 8/1981 | Gostomski et al. |
| 4,320,907 | A | 3/1982 | Eaton |
| 4,352,596 | A | 10/1982 | Hammett |
| 4,388,012 | A | 6/1983 | Erickson |
| 4,560,184 | A | 12/1985 | Williams, Jr. |
| 4,685,695 | A | 8/1987 | LeVee |
| 4,778,196 | A | 10/1988 | Spoliansky |
| 4,854,604 | A | 8/1989 | Stallsworth |
| 4,913,078 | A | 4/1990 | Haverly |
| 4,925,205 | A | 5/1990 | Villalon et al. |
| 4,958,847 | A | 9/1990 | Williams |
| 5,147,096 | A | 9/1992 | Rogers |
| 5,181,405 | A | 1/1993 | Wheeler |
| 5,192,176 | A | 3/1993 | Roberts |
| 5,263,735 | A | 11/1993 | Mann |
| 5,326,213 | A | 7/1994 | Roberts |
| 5,354,087 | A | 10/1994 | Head |
| 5,382,109 | A | 1/1995 | Nyman |
| 5,385,363 | A | 1/1995 | Morey |
| 5,482,309 | A | 1/1996 | Hollis |
| 5,683,094 | A | 11/1997 | Gullickson |
| 6,186,532 | B1 | 2/2001 | Ray et al. |
| 6,464,241 | B1 | 10/2002 | Daniel |
| 6,467,793 | B2 | 10/2002 | Putnam |
| 7,100,937 | B2 * | 9/2006 | Hogan ......................... 280/507 |
| 7,378,013 | B2 | 5/2008 | Sandler |
| 2003/0047908 | A1 * | 3/2003 | Lara ......................... 280/441.2 |
| 2004/0195801 | A1 | 10/2004 | Lara |

OTHER PUBLICATIONS

Butler Products, catalog, circa 2010.

Oct. 17, 2013, Office action from U.S. Patent & Trademark Office, in U.S. Appl. No. 13/485,785, to which this U.S. application claims the benefit of priority.

\* cited by examiner

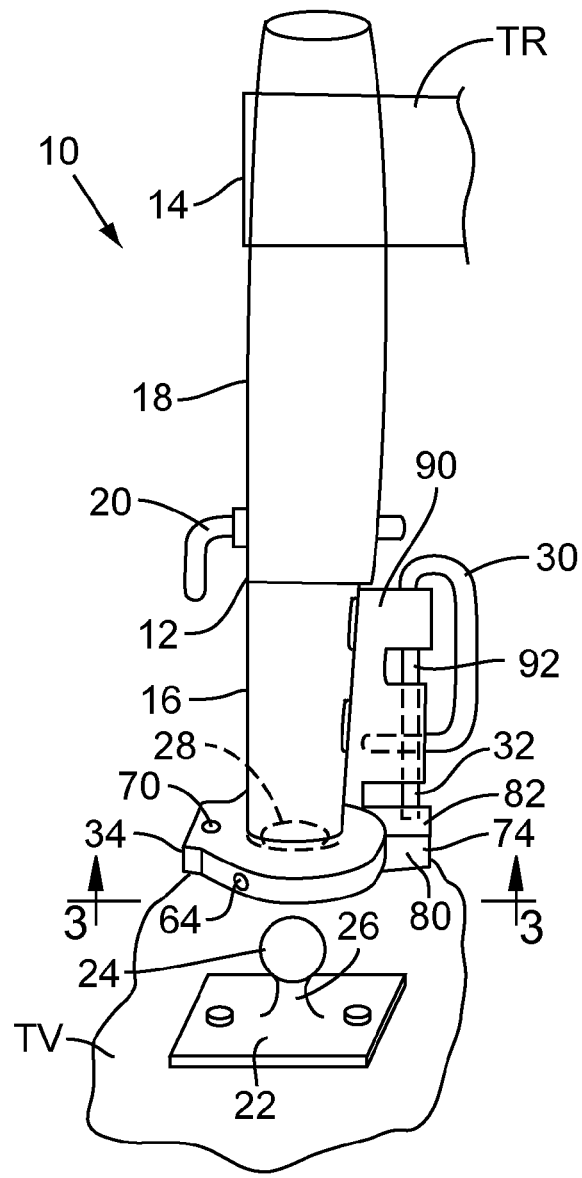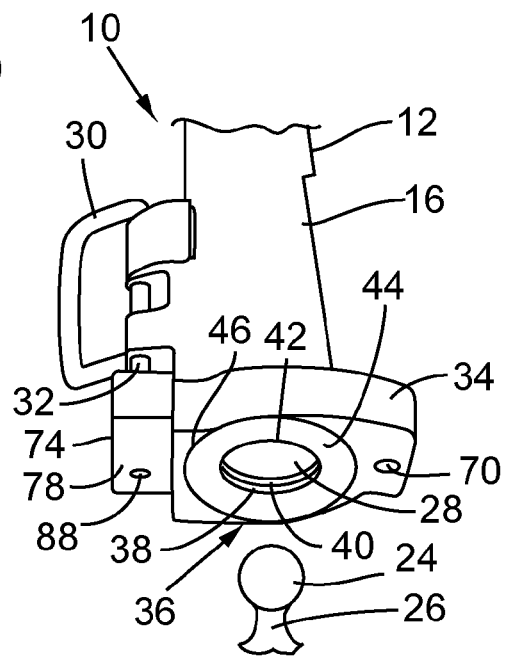
FIG. 1
FIG. 2

TRAILER COUPLER

CROSS-REFERENCE TO RELATED APPLICATIONS

The present application is continuation of U.S. patent application Ser. No. 13/485,785, filed May 31, 2012, which claims priority to U.S. Provisional Patent Application Ser. No. 61/491,840, filed May 31, 2011, both of which are incorporated by reference herein.

BACKGROUND

The present invention relates to a structure and components for a trailer coupler that attaches to the hitch ball of a towing vehicle. The structure and components are particularly suited to the gooseneck variety of trailer couplers but may also be used in other varieties of couplers. Gooseneck couplers typically extend downwardly from a nose of the trailer and provide a socket to receive a hitch ball. Such couplers typically include at a lowermost position a locking plate having a hole that can be aligned with the socket to receive the hitch ball, and misaligned so as to retain the hitch ball in the socket

BRIEF SUMMARY

According to one embodiment of the present invention, a trailer coupler for installation at a forward end of a trailer may be configured to attach to a hitch of a towing vehicle. The coupler may include an opening for the hitch ball, a socket to receive the ball, and an internal channel for a clamping bar. The internal channel may extend horizontally and be positioned above the opening and below the socket. The channel may include a laterally-facing aperture adjacent the second end, out of which one end of the clamping bar may extend. That end of the clamping bar may include a bracket with an open channel to fit over a flange on the coupler body.

According to an embodiment of the present invention, a method of assembling a trailer coupler may include inserting a first end of the clamping bar through the laterally-facing aperture, and moving the first end of the clamping bar into the coupler body channel while fitting the bracket over the flange at the open channel of the clamping bar.

BRIEF DESCRIPTION OF THE SEVERAL VIEWS OF THE DRAWINGS

FIG. 1 is a perspective view of a trailer coupler according to an embodiment of the present disclosure, showing portions of the trailer and towing vehicle and the hitch as well as the main shaft and coupler body with a handle to position and control the locking of the coupler.

FIG. 2 is a perspective view of the trailer coupler of FIG. 1, partially from below, showing the opening for the ball and the clamping bar above the opening.

DETAILED DESCRIPTION

Figure 3:
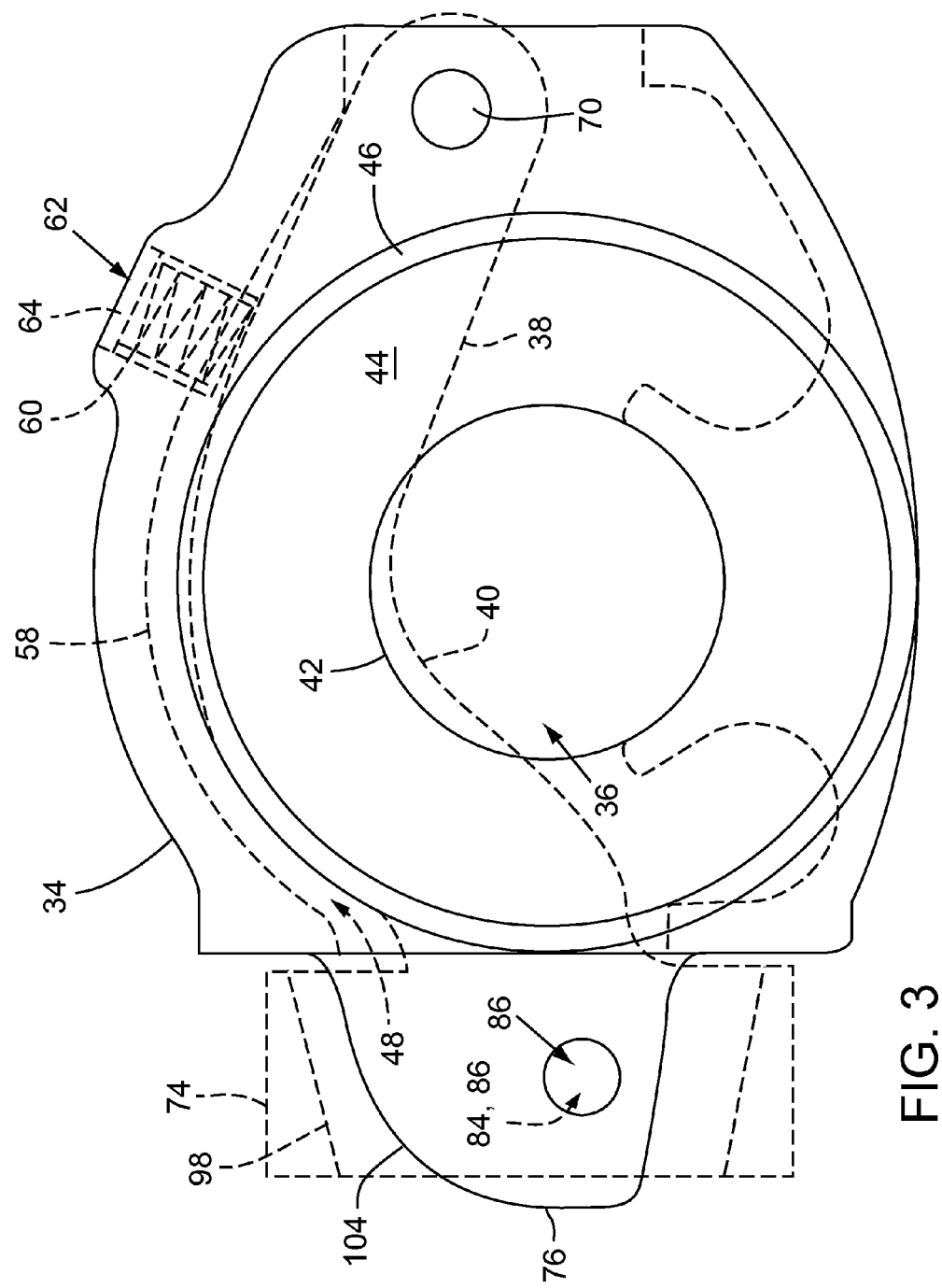
FIG. 3 is a view from directly below the trailer coupler showing a flange with a locking hole, and, in phantom lines, the clamping bar, and a channel and a spring for the clamping bar.

As shown in FIGS. 1 and 2, a trailer coupler 10 in accordance with the present description has an external appearance much the same as conventional trailer couplers of the gooseneck variety. Trailer coupler 10 may include an upwardly extending pipe, tube, or shaft 12 for attachment to a trailer TR at a brace or bracket 14 at the front or forward end of trailer TR. Shaft 12 may be in one or two sections 16, 18 or otherwise configured for adjustability in height, for example, as controlled by the relative positioning of sections 16, 18 as fixed by a pin 20.

Trailer coupler 10 may be coupled to a towing vehicle TV at a hitch 22 that typically includes a ball 24 and a neck 26 below the ball. When coupled, ball 24 is inside coupler 10 and a socket 28 rests on ball 24, allowing for articulation of the trailer relative to the towing vehicle with the general degrees of freedom associated with a ball-and-socket arrangement.

A handle 30 with a locking pin 32 is operable to lock the coupler onto the ball to prevent disconnection of the hitch and coupler, while still allowing relative rotational movements at the ball-and-socket interface. The operation and structure appears generally the same as for conventional gooseneck trailer couplers, however an external difference is that a coupler body 34, which conventionally is a two-piece combination of a socket body with a locking plate, may be formed in a single piece, preferably by casting.

In the coupler body of the present embodiment, a downwardly-facing opening 36 is configured to allow ball 24 to pass therethrough and into socket 28 above opening 36. Socket 28 receives ball 24 in a mating arrangement allowing rotational movement as described above.

As will be described in more detail for FIGS. 3-6, a clamping bar 38 in coupler body 34 may be positioned between opening 36 and socket 28, that is, above opening 36 and below socket 28. Clamping bar 38 may be operated to a locked position (shown in FIG. 2) which will hold ball 24 in socket 28 and prevent the ball from passing back out through the opening. Clamping bar 38 is held in the locked position by lock pin 32 as will be further described. Typically, in the locked position, a curved middle portion 40 of clamping bar 38 is positioned to partially block opening 36 and may contact neck 26 of ball 24. This positioning of clamping bar 38 tends to hold the ball in the socket.

As seen in FIGS. 2-3, opening 36 may be defined by a circular edge 42 that typically is an upper end of a frustoconical section 44 that has a lower end 46. Section 44 may be useful in guiding ball 24 into and through opening 36 when initially misaligned.

Figure 4A:
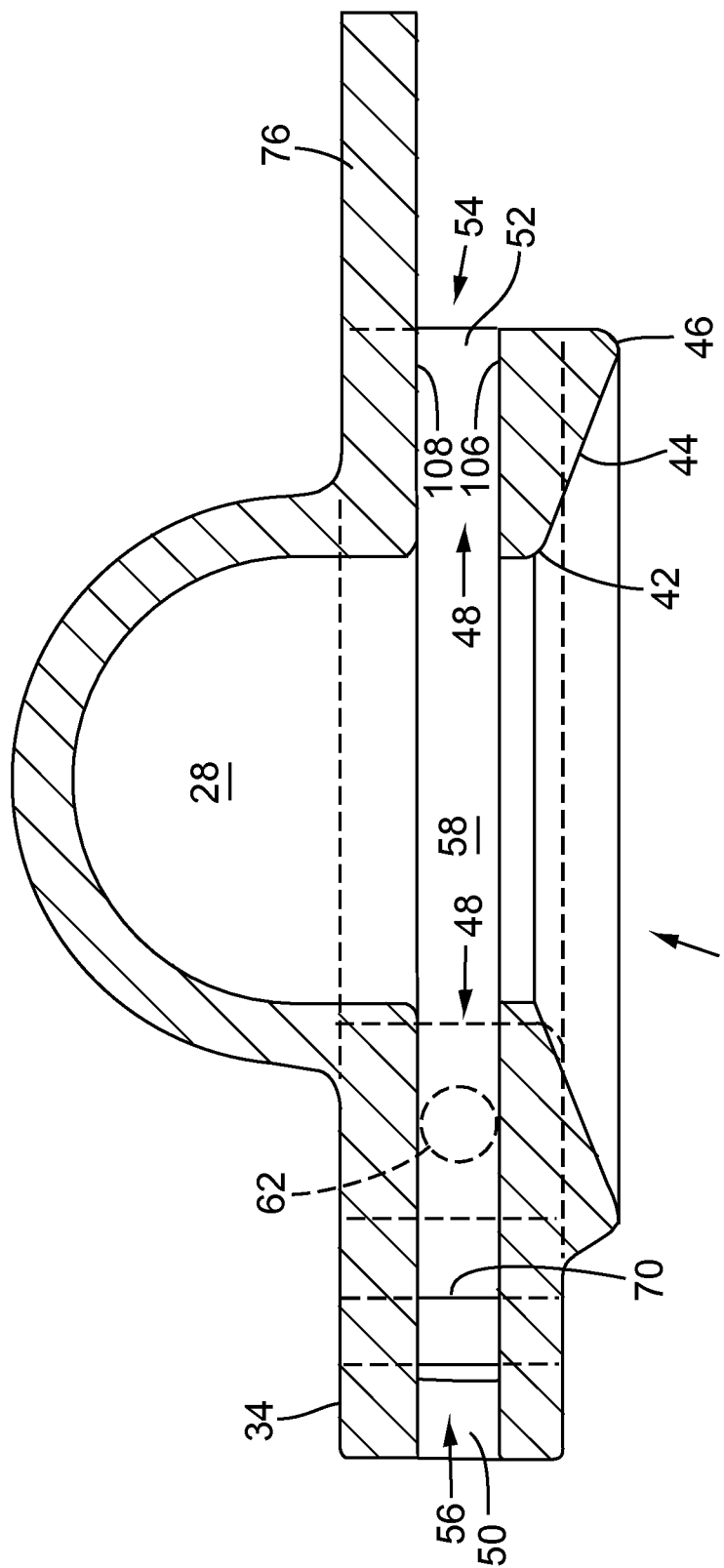
FIGS. 4a and 4b are cross-sectional views of the coupler body, both without and with the clamping bar installed, respectively.

As best seen in FIG. 4a, with clamping bar 38 removed, coupler body 34 includes an internal channel 48 extending horizontally between a first end 50 and a second end 52. Internal channel 48 is preferably positioned above opening 36 and its circular edge 42, and below socket 28.

Internal channel 48 typically includes a laterally-facing aperture 54 adjacent second end 52, and may also include another laterally facing aperture 56 adjacent its first end 50. One or both of the laterally-facing apertures may be used during assembly for insertion and installation of clamping bar 38.

A side wall 58, preferably a portion of the single-piece, uni-body casting of coupler body 34, may enclose a side of channel 48. A biasing member, such as a spring 60 may be installed in side wall 58, or elsewhere, as suited to biasing clamping bar 38 into the locked position. Spring 60 may be installed in a through-hole 62 in wall 58, and then held in place by a welded closure 64 or a nut threaded into place, or installed by any other suitable means.

Figure 4B:
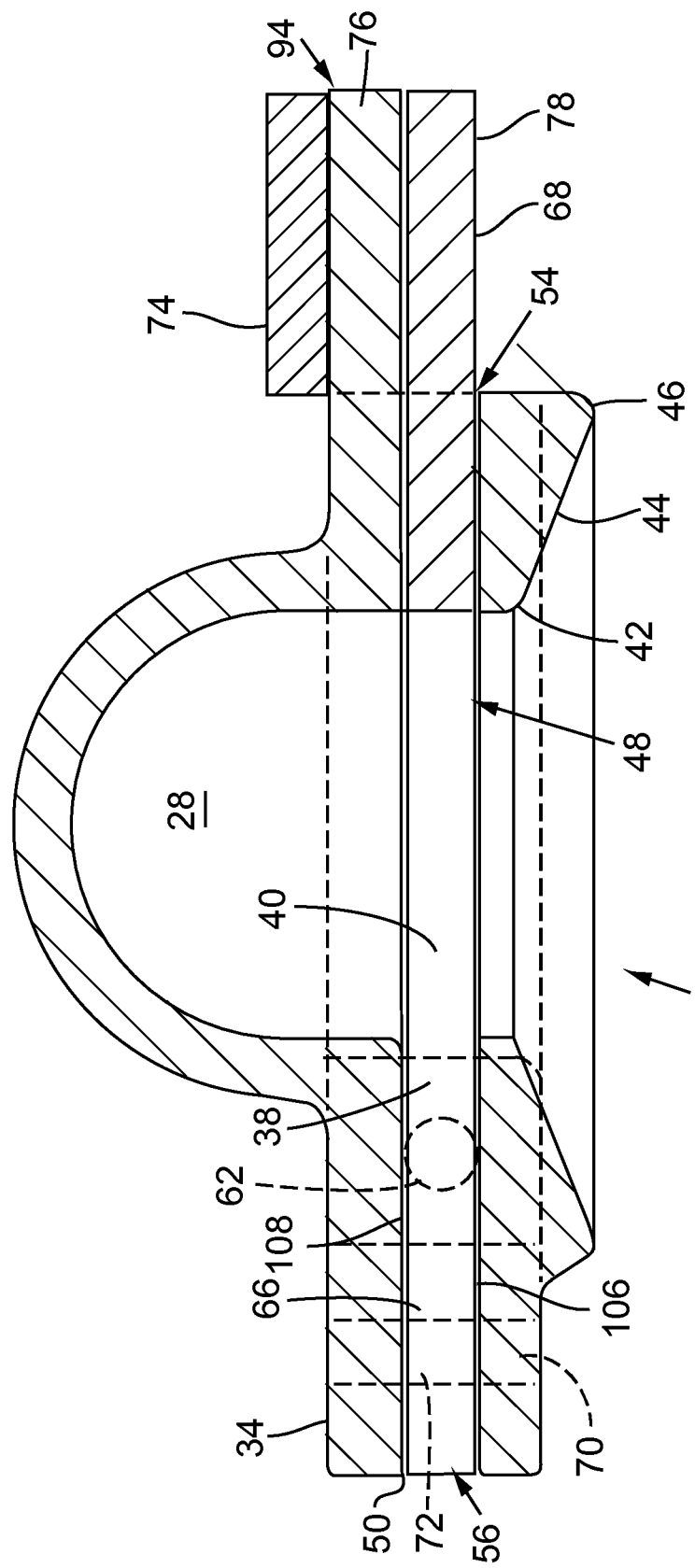
Figure 5:
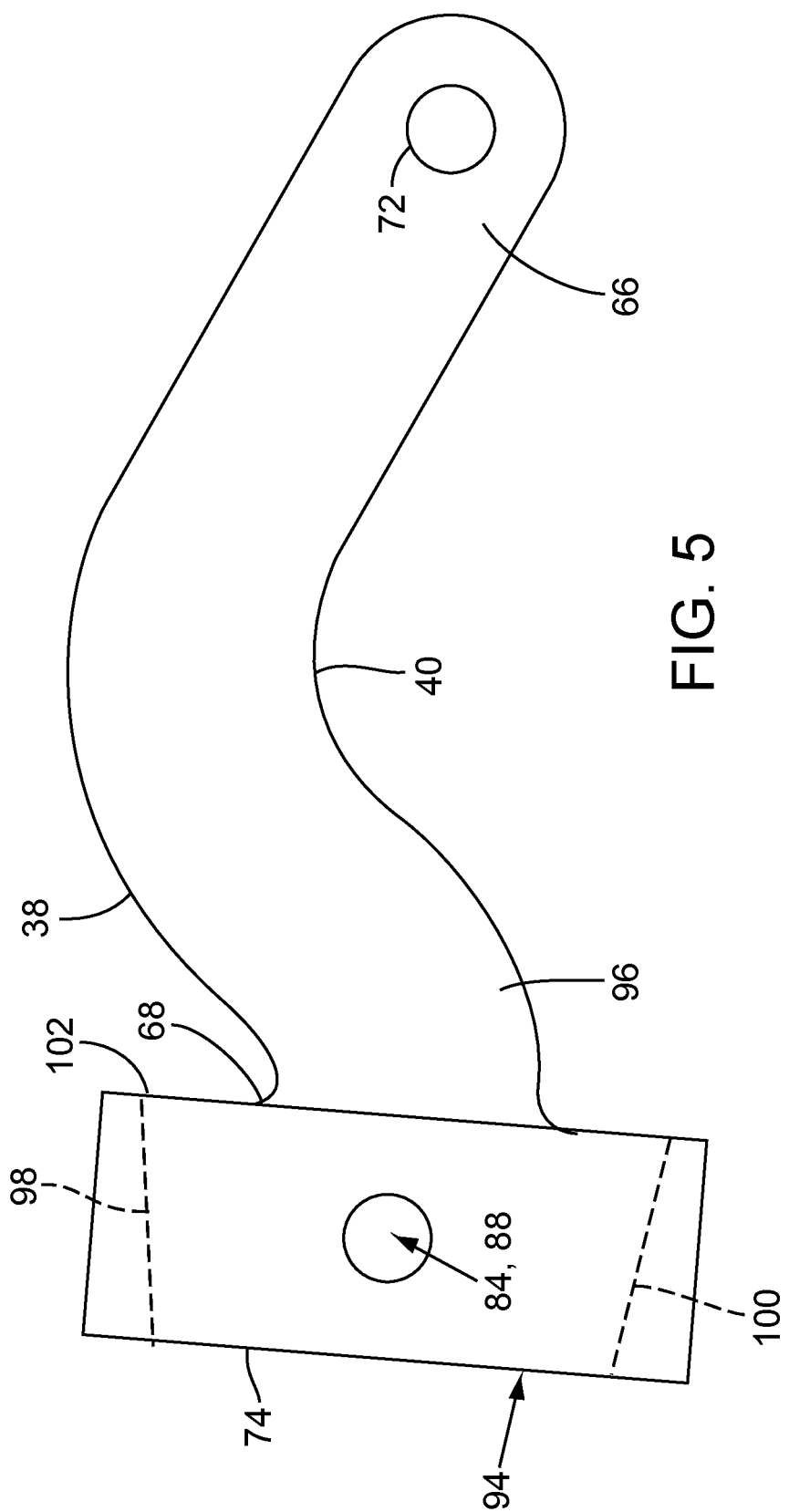
FIG. 5 is a plan view of the clamping bar.

As seen in FIG. 4b, clamping bar 38 may define a first end 66 within first end 50 of channel 48. Clamping bar 38 typically includes curved middle portion 40 adjacent opening 36.

Clamping bar 38 may have a second end 68 extending out of laterally-facing aperture 54 of channel 48.

Clamping bar 38 is preferably movable between an open position and the locked position (FIGS. 2 and 3). In the open position, the clamping bar is typically substantially clear of opening 36 to allow ball 24 to pass therethrough. For movement between the positions, clamping bar 38 may be mounted on a pivot joint, such as one formed by a rod or bolt 70 in coupler body 34 adjacent first end 50 of channel 48. Rod or bolt 70 may be held in place in coupler body 34 by any suitable means such as welding or fastening with a nut, and clamping bar 38 may be mounted thereon at a through-hole 72. Such a pivot joint allows pivotal movement of the clamping bar between the locked position and the open position.

Second end 68 of clamping bar 38 typically includes a bracket 74 that fits over a flange or protrusion 76 on coupler body 34. Bracket 74 may include a lower portion 78, side portions 80 and upper portion 82. Preferably, holes 84, 86, and 88 are provided through upper portion 80, flange 76, and lower portion 78, respectively. The holes are positioned to be aligned when clamping bar 38 is in the locked position. Locking pin 32 on handle 30, in the locked position preferably extends through holes 84, 86, and 88.

Handle 30 is typically spring-loaded downwardly to hold the pin in the locked position. Handle 30 may be associated with a sheath 90 mounted on shaft 12 that supports the handle and provides a detent 92 to which handle 30 may be shifted to hold the locking pin 32 away from holes 84, 86, and 88.

As noted above, coupler 34 is preferably formed in a single casting to have a unitary body with features such as socket 28, opening 36, frustoconical section 44, channel 48, and/or lateral openings 54, 56 already formed therein. Coupler body 34 may be machined and/or otherwise processed to form one or more of its features.

Installation of clamping bar 38 may be facilitated by lateral openings 54, 56, and by the particular shape of bracket 74 and flange 76. For example, clamping bar 38 may be inserted into channel 48 starting with first end 66 of bar 38 at channel aperture 54. By this method, clamping bar 38 may be moved within channel 48 until first end 66 is adjacent channel first end 50. Alignment of hole 72 for insertion of rod or bolt 70 may be facilitated by access to bar 38 via channel aperture 56.

The curvature of bar 38, as well the shape and size of an open channel 94 through bracket 74 may be coordinated with a shape of flange 76 to facilitate insertion of bar 38 into channel 48. For example, bar 38 may be substantially straight between first end 66 and curved middle portion 40 and then curve in an opposite direction at a curved portion 96 between the middle and the second end 68. Bracket 74 may be aligned substantially perpendicularly to second end 68. Open channel 94 of bracket may be provided with side walls 98, 100, one or both of which may be narrowed on an inner side 102 to facilitate installation of bracket 74 over flange 76. A curvature 104 may be provided on flange 76 similarly to facilitate insertion of bracket 74 over flange 76. Channel 48 may be further defined by a floor 106 and ceiling 108.

Spring 60 may be externally inserted through side wall 58 after installation of bar 38. Alternatively, it may be installed in hole 62 prior to installation of the bar 38.

A typical combination of a trailer with a towing vehicle is for the coupler to be part of the trailer and in the orientation as described herein, and the hitch to be part of the towing vehicle and in the orientation as described herein. Alternatively, the coupler may be part of the towing vehicle and the hitch part of the trailer and the orientation of the parts may be switched or otherwise altered. Terms such as downwardly facing opening are to be understood as explaining the preferred embodiment and as incorporating different possible orientations within the scope of the present description.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in any claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A trailer coupler for installation at a forward end of a trailer, the coupler configured to attach to a hitch of a towing vehicle, the hitch defining a ball and a neck below the ball, the coupler comprising:
    a. a coupler body including
        i. a downwardly-facing opening configured to allow the ball to pass therethrough,
        ii. a socket above the opening for receiving the ball, and
        iii. an internal channel,
    b. a clamping bar including a first portion adjacent the opening and including a second portion pivotally mounted within the internal channel of the coupler body, the clamping bar pivotable between a locked position and an open position, the opening-adjacent first portion of the clamping bar in the locked position being positioned to partially block the opening and configured to contact the neck of the ball to hold the ball in the socket, and further including a pin selectively operable to hold the clamping bar in the locked position.

2. The coupler of claim 1, further including a means for biasing the clamping bar to one of the locked and the open positions.

3. The coupler of claim 2 wherein the biasing means biases the clamping bar to the locked position.

4. The coupler of claim 1 further wherein coupler body is formed substantially as a one-piece casting.

5. The coupler of claim 4 wherein the coupler body further includes a hole for mounting a hinge pin for pivotal mounting of the clamping bar.

6. The coupler of claim 1 wherein the coupler body further includes a flange; and further including a handle mounted to the flange and operable to move the clamping bar between the open and the locked positions.

7. The coupler of claim 1 wherein the coupler body further includes a flange; and further including a handle mounted to the flange and operable with a pin to hold the clamping bar in the locked position.

* * * * *